Nov. 4, 1941.         A. C. ERDMAN         2,261,901
FLEXIBLE SHAFT COUPLING
Filed March 20, 1941
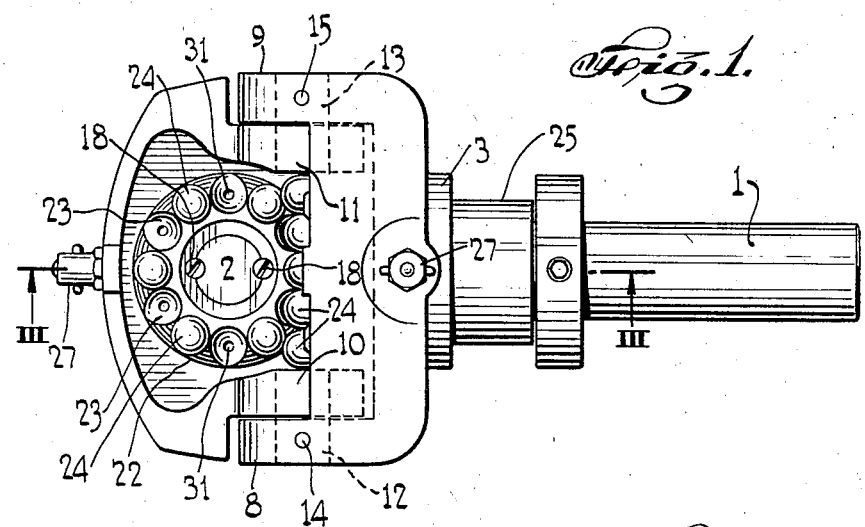
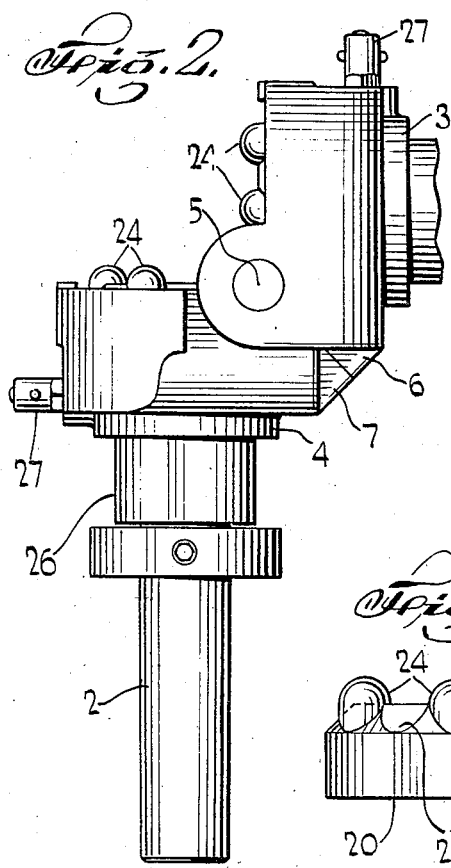
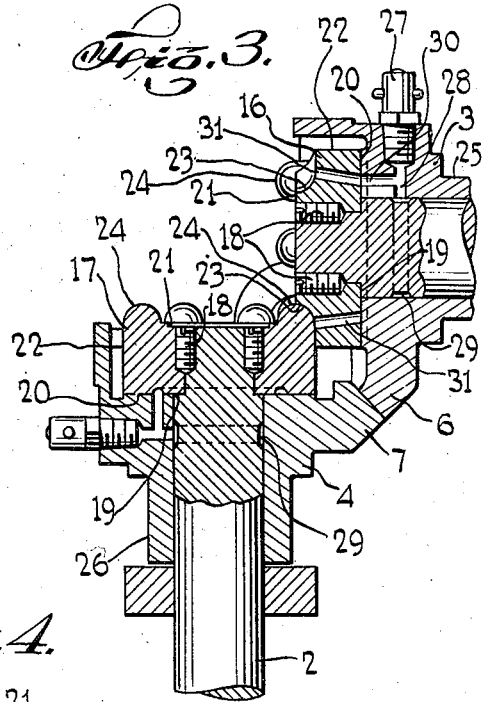
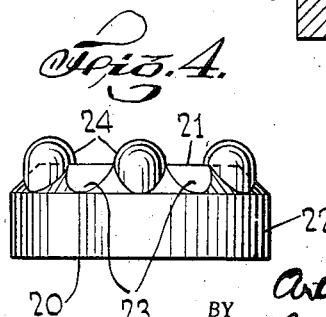
INVENTOR.
Arthur Christopher Erdman
BY Lyman E. Dodge
ATTORNEY Patented Nov. 4, 1941

2,261,901

UNITED STATES PATENT OFFICE 2,261,901

FLEXIBLE SHAFT COUPLING

Arthur Christopher Erdman, Albany, N. Y., assignor to Consolidated Car Heating Company, Inc., Albany, N. Y., a corporation of New York Application March 20, 1941, Serial No. 384,301

3 Claims. (Cl. 74—380)

This invention relates to machine elements, particularly coupling elements, and more especially flexible shaft couplings.

A principal object of this invention is the production of a device of the type specified which is so constructed that all parts may be easily, sufficiently and properly lubricated.

A further object of the invention is the provision of a device of the type specified which will be simple in construction, readily built, easily installed and maintained, and durable and efficient in operation.

A further object of the invention is the provision of a device of the type specified in which two meshing gears of exactly identical form may be used.

Further objects and advantages will appear as the description of the invention and the particular physical embodiments selected to illustrate the invention progresses, and the novel features will be particularly pointed out in the appended claims.

In describing the invention in detail, and the particular physical embodiments selected to illustrate the invention, reference will be had to the accompanying drawing and the several views thereon in which like characters of reference designate like parts throughout the several views, and in which:

Figure 1 is a top plan view of a flexible shaft coupling embodying applicant's invention; Fig. 2 is a fragmentary side elevational view of the device as shown by Fig. 1; Fig. 3 is a cross-sectional view on the plane indicated by the line III—III of Fig. 1, viewed in the direction of the arrows at the ends of the line; Fig. 4 is a side elevational view of a gear used in the device as shown by Figs. 1 to 3 inclusive.

In the figures 1 designates one shaft of a flexible shaft coupling and 2 designates another shaft of the same flexible shaft coupling. These shafts being shown in the figures at an angle of 90 degrees one with the other.

As is well understood the driving of one of the shafts is intended to cause a like movement of the other shaft and either shaft may be indiscriminately selected as the driving shaft.

Each of the shafts is journaled in a housing. Shaft 1 is journaled in the housing 3 and shaft 2 is journaled in the housing 4.

The housings 3 and 4 are pivoted one on the other so as to be oscillatable about the axis 5 so that the shafts 1 and 2 may take various angular positions one to the other through an arc of 90 degrees in the plane of the drawing paper. One extreme of the arc occupied by shaft 1 is as shown in Fig. 2 and the other would be with the shaft 1 directly in line with and above shaft 2. The limit of movement in one direction is determined by the engagement of the limiting stops 6 and 7, one on housing 3 and the other on housing 4.

A preferred construction for pivoting one housing on the other is to form mating ears, in pairs, as 8 and 9 on housing 3, and 10 and 11 on housing 4. Each ear is orificed and pivot pins as 12 and 13 are positioned in the orifices and preferably held therein by pins 14 and 15.

Each shaft, as 1 and 2, is provided on its end with a gear. Shaft 1 has gear 16 thereon. Shaft 2 has gear 17 thereon. Each of these gears is identical with the other and each may be secured to the end of its respective shaft by any suitable or appropriate means as by blind set screws 18. The shafts are preferably provided with shoulders, as at 19, contacting the rear face of the gear.

Each of the gears is formed with a body which is substantially a disc. This disc has a back face as 20 and a front face as 21 and a peripheral face as 22. Each gear is formed with alternate projections and depressions. The projections extend beyond the front face in one direction and the depressions extend below the front face in the other direction. The projections are substantially one half a sphere or a hemisphere, and are substantially tangent to the peripheral face. The depressions are a modified hemispherical depression. A depression such as 23 could be formed by first forming a true hemispherical depression and then the portion between the center of the bottom of the depression and the periphery 22 of the disc carved down until on a radial line from the center of the shaft as 2, to the periphery as of a gear disc the surface is a plane surface parallel to the upper plane surface 21 of the disc and of a width sufficient to receive one of the teeth as 24 when that tooth engages the depression with the shafts 1 and 2 at a right angle to each other. That is, the depressions 23 are so formed as to receive a hemispherical tooth end 24 when the disc bearing that tooth end has its front face 21 parallel to the front face of the disc bearing the depression or at an angle of 90 degrees thereto, as shown in Fig. 3.

By constructing each of the gears in exactly the same manner, it is necessary to have only one set of tools, dies and jigs for making the gears. By making the gears with alternate projections and depressions the gears are very much stronger and so can transmit a much greater load without breaking than if one disc contains all of the depressions and the other disc contains all of the projections, because by alternating the projections and depressions, there is not the thin weak wall between depressions which would appear if one gear was formed with all of the depressions and the other gear with all of the projections, unless a greater spacing of teeth were made. By applicant's method the operative teeth or projections and depressions virtually merge into one another whereas if all of the depressions were on one disc and all of the projections on the other disc, it would be necessary to space the depressions a greater distance apart along the pitch line than the spacing of a tooth and a depression in applicant's form of gear.

In order to position and hold the flexible coupling in a proper position for performing its function, applicant provides a cylindrical protuberance as 25 on housing 3 and a like protuberance 25 on housing 4. These protuberances afford a surface which may be grasped by suitable holding means to position the parts of the flexible coupling.

In order to afford lubrication to the shafts and to the gear teeth, applicant provides a commonly used fitting, as an Alemite fitting, as 27, on each of the housings. Lubricating material may be forced through this fitting and into the channels 28 and 29 to lubricate the shaft and into channels, as 30, communicating with channels, as 31, opening into a depression to lubricate the teeth of the gears.

Although I have particularly described several particular physical embodiments of my invention and explained the operation, construction and principle thereof, nevertheless, I desire to have it understood that the forms selected are merely illustrative but do not exhaust the possible physical embodiments of the idea of means underlying my invention.

What I claim as new and desire to secure by Letters Patent of the United States, is:

1. A flexible coupling, including, in combination: a first housing formed with an orifice for receiving a shaft; a second housing formed with an orifice for receiving a shaft; each of the housings provided with ears aligned with ears of the other housing and arranged in pairs and each ear formed with an aligning orifice and each orifice having a pivot pin therein; shafts, one in each orifice; inter-engaging gears, one on the end of each shaft, each gear being substantially in the form of a disc with a front surface and a rear surface and a peripheral surface, and alternate projections and depressions formed on each disc, the projections extending beyond the front face in one direction and the depressions extending below the front face in the other direction and the projections substantially tangent to the peripheral face and the depressions opening both on the front face and on the peripheral face.

2. A gear adapted to intermesh with a like gear said gear having a body portion in substantially the form of an annulus having a front face, a rear face and a peripheral face, alternate projections and depressions formed in the front face, the projections being substantially hemispheres and projecting beyond the front face in one direction, and depressions extending from the front face in the direction opposite the extension of the projections and being so formed that they will each receive a projection of a like gear when that like gear has its front face parallel to the said front face and also when at an angle of 90 degrees thereto and in all intermediate positions.

3. A gear having a body formed substantially as an annulus having a front face and a rear face and a peripheral face, and alternate projections and depressions on the front face; the surface of the alternate projections and depressions substantially merging and the projections being substantially hemispheres and extending beyond the front face, the depressions extending in the opposite direction from the projections from the front face and each depression being formed with a curved surface adapted to substantially embrace one half of the hemispherical projecting tooth of a like gear when the front faces thereof are parallel each to each and also formed with a surface adapted to embrace substantially one half of a projecting tooth of a like gear when that like gear has its front face at substantially a right angle to the first above mentioned face and in all positions intermediate thereto.

ARTHUR CHRISTOPHER ERDMAN.